US008627622B2

(12) United States Patent
Koenig, Jr. et al.

(10) Patent No.: US 8,627,622 B2
(45) Date of Patent: Jan. 14, 2014

(54) DRYWALL-TRIMMING STRIP FOR TRIMMING ARCHWAY

(75) Inventors: Joseph M. Koenig, Jr., Glenview, IL (US); Mark Budzik, Des Plaines, IL (US)

(73) Assignee: Trim-Tex, Inc., Lincolnwood, IL (US)

( * ) Notice: Subject to any disclaimer, the term of this patent is extended or adjusted under 35 U.S.C. 154(b) by 1932 days.

(21) Appl. No.: 11/524,126

(22) Filed: Sep. 20, 2006

(65) Prior Publication Data
US 2008/0066403 A1   Mar. 20, 2008

(51) Int. Cl.
*E04B 1/32* (2006.01)
*E04B 1/00* (2006.01)
*F16B 7/00* (2006.01)
*A47G 1/10* (2006.01)
*B32B 3/02* (2006.01)
*B32B 3/04* (2006.01)
*B32B 23/02* (2006.01)

(52) U.S. Cl.
USPC ........ 52/255; 52/86; 52/254; 52/256; 52/257; 403/298; 403/402; 428/83; 428/122; 428/192

(58) Field of Classification Search
USPC .................. 52/86, 244, 254–257, 273, 287.1, 52/717.03; 403/267, 294, 298, 402; 428/83, 122, 192
See application file for complete search history.

(56) References Cited

U.S. PATENT DOCUMENTS

| | | | | |
|---|---|---|---|---|
| 290,750 A | * | 12/1883 | Da Cunha | 52/255 |
| 3,008,273 A | * | 11/1961 | Widin | 52/85 |
| 5,045,374 A | * | 9/1991 | Tucker | 428/83 |
| 5,048,247 A | * | 9/1991 | Weldy | 52/255 |
| 5,138,810 A | * | 8/1992 | Kartler | 52/254 |
| 5,671,583 A | * | 9/1997 | Turner | 52/745.16 |
| 5,816,002 A | * | 10/1998 | Bifano et al. | 52/255 |
| 5,943,835 A | * | 8/1999 | von Saint-George | 52/287.1 |
| 6,119,420 A | * | 9/2000 | Koenig et al. | 52/255 |
| 6,145,259 A | * | 11/2000 | Koenig et al. | 52/287.1 |

* cited by examiner

*Primary Examiner* — Brian Glessner
*Assistant Examiner* — Omar Hijaz
(74) *Attorney, Agent, or Firm* — Wood, Phillips, Katz, Clark & Mortimer

(57) ABSTRACT

A drywall-trimming strip for trimming an archway has a nose with a tabbed edge and a flanged edge. A first series of slits spaced from one another define a series of tabs spaced from one another along the tabbed edge. A flange extends from and along the flanged edge. The tabs are joined to the tabbed edge of the nose by a continuous juncture extending along and defining the tabbed edge of the nose, which has a second series of slits extending to the continuous juncture and spaced from one another, as the slits defining the tabs are spaced from one another. All parts of the drywall-trimming strip are made from a comparatively harder, less flexible, polymeric material, such as polyvinyl chloride having a hardness of Durometer Shore 82 D, except for the continuous juncture, which is made from a comparatively softer, more flexible material, such as polyvinyl chloride having a hardness of Durometer Shore 92 A.

6 Claims, 2 Drawing Sheets

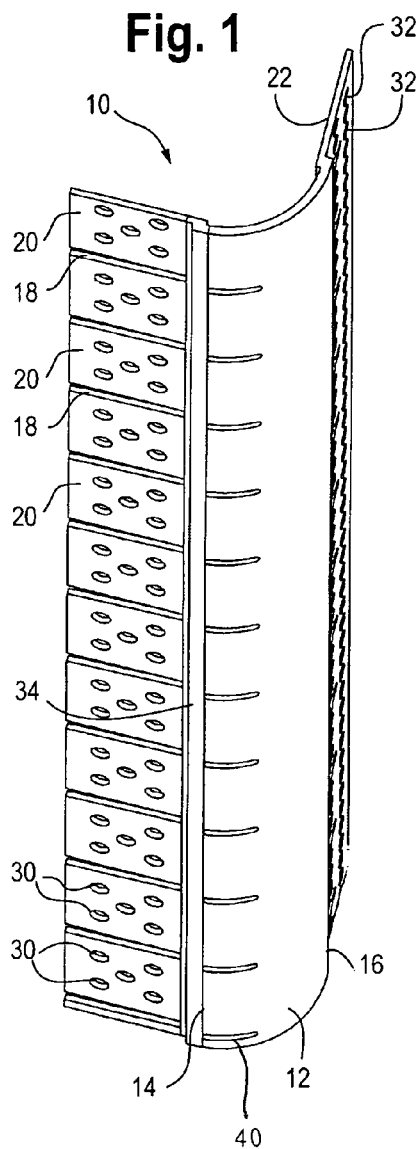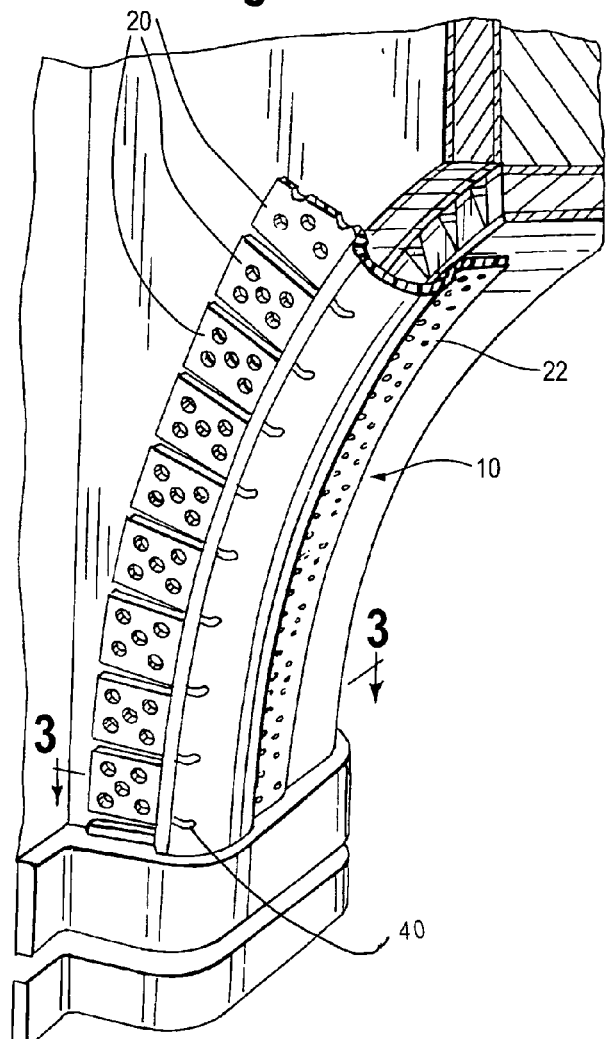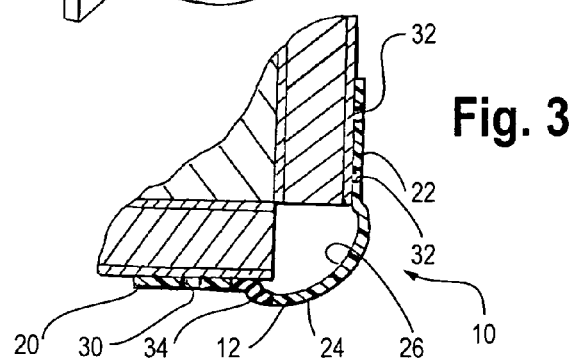

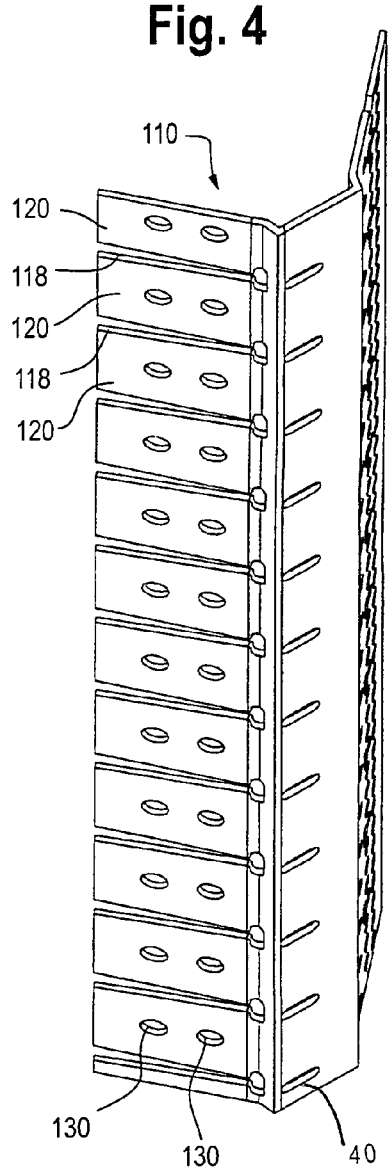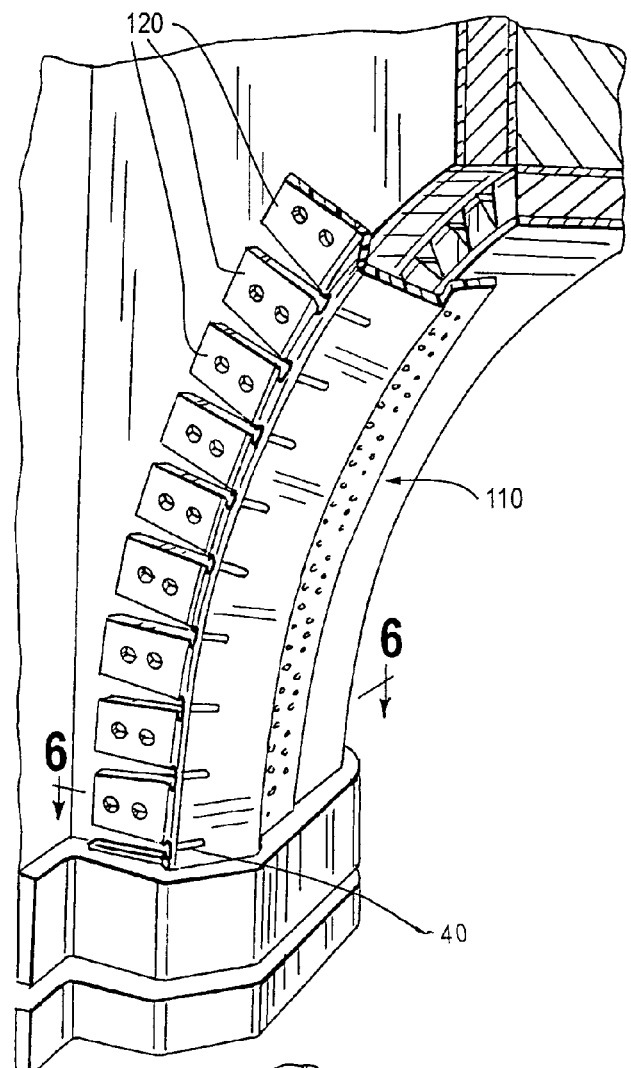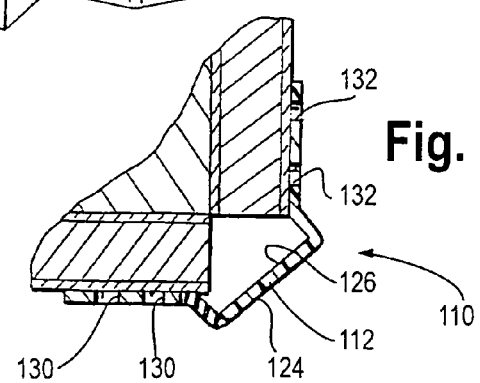

DRYWALL-TRIMMING STRIP FOR TRIMMING ARCHWAY

TECHNICAL FIELD OF THE INVENTION

This invention pertains to a drywall-trimming strip, which has a nose and a series of tabs spaced from one another along a tabbed edge of the nose, whereby the drywall-trimming strip is curvable so as to conform to an archway, and which is improved by this invention, whereby an outer surface of the nose tends to continue to conform substantially to an arcuate profile even after the drywall-trimming strip has been curved so as to conform to an archway.

BACKGROUND OF THE INVENTION

As used for trimming an archway around a doorway or around a window, a drywall-trimming strip as known heretofore is extruded from a substantially rigid, polymeric material, such as polyvinyl chloride, so as to have a nose with a tabbed edge and an opposite edge, a series of slits defining a series of tabs, which are spaced from one another along the tabbed edge. Usually, the drywall-trimming strip has a flange extending from the opposite edge.

For most applications, the drywall-trimming strip is curved so that so that the tabs are splayed outwardly, so that the tabs can be suitably tacked (e.g. adhesively or via staples) to a drywall panel defining one side of an archway, and so that the flange is curved so as to conform to the archway. The tabs are punched so as to have multiple holes or multiple slits. For many applications, in which the flange overlies a drywall panel that has been curved, the flange is punched similarly and tacked similarly. For some applications, in which a flange is provided, the flange is not punched.

After the tabs have been tacked, along with the flange if the flange is punched and tacked, drywall-finishing material (so-called drywall compound) is applied over the tabs, and over the flange if the flange is punched and tacked, and is pressed through the punched holes or punched slits. When pressed through the punched holes or punched slits, drywall-finishing material adheres to the drywall panels underlying the drywall-trimming strip, so as to affix the drywall-finishing strip permanently to the underlying panels.

Commonly, if the outer surface of the nose conforms substantially to an arcuate profile having a radius larger than approximately one-half inch, the drywall-trimming strip is known as a "bullnose" archway corner bead. In a "bullnose" archway corner bead, it was common for the tab-defining slits to extend into the nose, approximately to or slightly past an imaginary midline along the outer surface of the nose.

An improvement in a drywall-trimming strip for trimming an archway is disclosed in U.S. Pat. No. 6,119,420, the disclosure of which is incorporated by reference herein. As disclosed therein, a drywall-trimming strip has a nose with an outer surface and an inner surface and has a tabbed edge and an opposite edge. The outer surface conforms substantially to an arcuate profile. The drywall-trimming strip has a series of slits, which define a series of tabs spaced from one another, along the tabbed edge, but which do not extend into the nose. The tabs are joined to the tabbed edge of the nose at a juncture. The drywall-trimming strip has a comparatively softer, more flexible portion, which includes the juncture, and a comparatively harder, less flexible portion, which includes at least a substantial portion of the nose along the opposite edge.

Another example of a drywall-trimming strip for trimming an archway is a so-called "350 Chamfer Arch," which has been sold for more than one year by Trim-Tex, Inc. of Lincolnwood, Ill. In the so-called "350 Chamfer Arch," which has a chamfered nose, a series of slits define a series of tabs spaced from one another, along a tabbed edge of the nose, but do not extend into the chamfered nose.

SUMMARY OF THE INVENTION

This invention provides, for trimming an archway, a drywall-trimming strip having a nose with a tabbed edge and an opposite edge. A first series of slits spaced from one another define a series of tabs, which are spaced from one another along the tabbed edge and which are joined to the tabbed edge of the nose by a continuous juncture extending along and defining the tabbed edge of the nose. The nose has a second series of slits extending to the continuous juncture and spaced from one another, as the slits defining the tabs are spaced from one another. All parts of the drywall-trimming strip are made or, at a minimum, the nose of the drywall-trimming strip is made from a comparatively harder, less flexible, polymeric material, except for the continuous juncture, which is made from a comparatively softer, more flexible, polymeric material.

Preferably, each respective slit of the second series is aligned with and is separated by the continuous juncture from an associated slit of the first series. Advantageously, this invention is useful where the nose has an outer surface conforming substantially to an arcuate profile, as in a "bullnose" archway corner bead, or where the nose is chamfered, as in the so-called "350 Chamfer Arch."

BRIEF DESCRIPTION OF THE DRAWINGS

FIG. 1 is a perspective view of a drywall-trimming strip constituting a first embodiment of this invention.

FIG. 2 is a fragmentary, perspective view of an archway, which is trimmed by the drywall-trimming strip of FIG. 1.

FIG. 3 is a sectional view, which is taken along line 1-1 of FIG. 2, in a direction indicated by arrows.

FIG. 4 is a perspective view of a drywall-trimming strip constituting a second embodiment of this invention.

FIG. 5 is a fragmentary, perspective view of an archway, which is trimmed by the drywall-trimming strip of FIG. 4.

FIG. 6 is a sectional view, which is taken along line 6-6 of FIG. 5, in a direction indicated by arrows.

DETAILED DESCRIPTION OF THE ILLUSTRATED EMBODIMENTS

As illustrated in FIGS. 1, 2, and 3, a drywall-trimming strip 10 constituting a first embodiment of this invention is similar to the drywall-trimming strip disclosed in U.S. Pat. No. 6,119, 420, supra, and is installed similarly to trim an archway, except as illustrated and described herein. Thus, the drywall-trimming strip 10 has a nose 12 with a tabbed edge 14 and a flanged edge 16, a first series of slits 18 spaced from one another and defining a series of tabs 20, which are spaced from one another along the tabbed edge 14, and a flange 22, which extends from and along the flanged edge 16. Also, the nose 12 has an outer surface 24 and an inner surface 26. The outer surface 24 conforms generally to an arcuate profile having a radius in a range from approximately ¼ inch to approximately ¾ inch. Also, the tabs 20 are punched so as to have multiple holes 30 and the flange 22 is punched so as to have multiple holes 32.

Further, the drywall-trimming strip 10 is co-extruded as a straight piece from a comparatively harder, less flexible, polymeric material, such as polyvinyl chloride having a hardness of Durometer 82 Shore D, and from a comparatively softer, more flexible, polymeric material, such as polyvinyl chloride having a hardness of Durometer 92 Shore A. All parts of the drywall-trimming strip 10 are made from the comparatively harder, less flexible, polymeric material, except for a continuous juncture 34, which extends along the tabbed edge 14, between the tabbed edge 14 and the slits 18 defining the tabs 20, and which is made from the comparatively softer, more flexible, polymeric material.

However, the drywall-trimming strip 10 differs from the drywall-trimming strip disclosed in U.S. Pat. No. 6,119,420, supra, because the nose 12 of the drywall-trimming strip 10 has a second series of slits 40, which extend to the continuous juncture 34 from a mid-region of the nose 12 and which are spaced from one another as the slits 18 of the first series are spaced from one another. Preferably, as illustrated, each respective slit 40 of the second series is aligned with and is separated by the continuous juncture 34 from an associated slit 18 of the first series.

As illustrated in FIGS. 4, 5, and 6, a drywall-trimming strip 110 constituting a second embodiment of this invention is similar to the drywall-trimming strip 10 and is installed similarly to trim an archway, except that the nose 112 of the drywall-trimming strip 110 differs from the nose 12 of the drywall-trimming strip 10, except that the slits 118 defining the tabs 120 of the drywall-trimming strip 110 differ (in ways that do not affect this invention) from the slits 18 defining the tabs 20 of the drywall-trimming strip 10, and except that the punched holes 130, 132, of the drywall-trimming strip 110 differ (in ways that do not affect this invention) from the punched holes 30, 32, of the drywall-trimming strip 10. Specifically, the nose 112 of the drywall-trimming strip 110 differs from the nose 12 of the drywall-trimming strip 10, because the nose 112 has a planar, outer surface 124 and a planar, inner surface 126. The nose 112 may be thus described as chamfered.

As compared to the drywall-trimming strip disclosed in U.S. Pat. No. 6,119,420, supra, and to an otherwise similar, drywall-trimming strip having a chamfered nose, the drywall-trimming strips 10, 110, tend to exhibit less distortion of the noses 12, 112, when installed to trim archways. It is necessary, however, to fill the slits 18, 118, before the drywall-trimming strips 10, 110, are painted.

The invention claimed is:

1. For trimming an archway, a drywall-trimming strip having a nose with a tabbed edge and an opposite edge, the drywall-trimming strip having a first series of slits spaced from one another and defining a series of tabs spaced from one another along the tabbed edge, the tabs being joined to the tabbed edge of the nose by a continuous juncture extending along and defining the tabbed edge of the nose, the nose having a second series of slits extending to the continuous juncture and spaced from one another, as the slits defining the tabs are spaced from one another, wherein the nose of the drywall-trimming strip is made from a flexible, polymeric material, except for the continuous juncture, which is made from a softer, more flexible material in comparison to the polymeric material of the nose.

2. The drywall-trimming strip of claim 1, wherein each respective slit of the second series is separated by the continuous juncture from an associated slit of the first series.

3. For trimming an archway, a drywall-trimming strip having a nose with a tabbed edge and a flanged edge, the drywall-trimming strip having a first series of slits spaced from one another and defining a series of tabs spaced from one another along the tabbed edge, the drywall-trimming strip having a flange extending from and along the flanged edge, the tabs being joined to the tabbed edge of the nose by a continuous juncture extending along and defining the tabbed edge of the nose, the nose having a second series of slits extending to the continuous juncture and spaced from one another, as the slits defining the tabs are spaced from one another.

4. The drywall-trimming strip of claim 3, wherein each respective slit of the second series is aligned with and is separated by the continuous juncture from an associated slit of the first series.

5. The drywall-trimming strip of claim 1, 2, 3, or 4, wherein the nose has an outer surface conforming substantially to an arcuate profile.

6. The drywall-trimming strip of claim 1, 2, 3, or 4, wherein the nose is chamfered.

* * * * *